United States Patent [19]

Orban

[11] 4,054,677

[45] Oct. 18, 1977

[54] PROCESS FOR PREPARING VEGETAL PROTEINIC CONCENTRATES, PRODUCTS THEREBY OBTAINED, AND MILK SUBSTITUTING FEEDS CONTAINING SAID CONCENTRATES

[76] Inventor: Stefano Orban, Bagni di Tivoli, Rome, Italy

[21] Appl. No.: 600,379

[22] Filed: July 30, 1975

[30] Foreign Application Priority Data

July 30, 1974 Italy .................................. 5235/74

[51] Int. Cl.² .......................... A23J 3/00; A23K 1/14
[52] U.S. Cl. .................................. 426/602; 426/656; 426/807; 260/112 R
[58] Field of Search ............... 426/69, 72, 74, 601, 426/602, 656, 657, 805, 807; 260/112 R, 123.5

[56] References Cited

U.S. PATENT DOCUMENTS

| 2,295,643 | 9/1942 | Emery et al. ............ 426/656 X |
| 2,961,320 | 11/1960 | Cuthbertson et al. ........... 426/656 X |
| 3,080,234 | 3/1963 | Jarowski ................ 426/69 X |
| 3,391,001 | 7/1968 | Sair ...................... 426/656 |
| 3,397,991 | 8/1968 | Johnson et al. ............ 426/656 |
| 3,698,912 | 10/1972 | Winitz .................. 426/656 |

*Primary Examiner*—Raymond N. Jones
*Assistant Examiner*—R. A. Yoncoskie
*Attorney, Agent, or Firm*—Hauke & Patalidis

[57] ABSTRACT

The invention relates to a process for preparing an artificial milk useful for feeding young mammals in which the main proteinic components are of vegetal origin with the addition of animal proteins, minerals and lipids.

7 Claims, No Drawings

PROCESS FOR PREPARING VEGETAL PROTEINIC CONCENTRATES, PRODUCTS THEREBY OBTAINED, AND MILK SUBSTITUTING FEEDS CONTAINING SAID CONCENTRATES

The present invention relates to a process for preparing vegetal proteinic concentrates, the products thereby obtained and the milk substituting feeds containing said products. More particularly, this invention relates to a process by which proteins of vegetal origin are obtained, suitable to replace the milk proteins in the feeding of young mammals.

Specifically, this invention relates to the preparation of vegetal origin proteins having nourishing and digestibility properties similar to those of the natural milk.

Young mammals in their first period of life, have a digestive apparatus which is unable to perform the complicated digestive function occurring in the adult animals.

On the other hand, feeding the young animals with mother's milk, as in the case of the young calves, is uneconomical in view of the quantity consumed by the calves.

The products having a commercial interest, embodied up to now, concern the replacement of the cow's milk; said products substantially consist of non fat dried milk added with fats, vitamins, sugars and mineral salts.

Said products, besides having a high cost, have the drawback of being strictly connected with the production of cow's milk; accordingly the amount of milk destined to the production of these feeds will be thus withdrawn from the human feeding.

According to this invention, as substitutives of skimmed milk, use is made of concentrates of protein obtained from different proteinic vegetal raw materials namely: flour of soya, flour of peanuts, of ricinus, rapeseed, cotton, sunflower, maize gluten, rice, etc.

These raw materials have a proteinic content from 20% to 75% in the dry substance, accompanied by a non proteinic fraction consisting of carbohydrates in a more or less high amount, of raw fibers and of mineral salts.

From the physiological standpoint, the non proteinic fraction of these raw materials is one of the main factors preventing their use, in the absence of a suitable change, for feeding the young animals.

Accordingly, the non proteinic fraction of these raw materials, in order to be capable of being used for feeding purposes, must be suitably transformed into an assimilable product, or if such a result is impossible, it must be separated and removed from the proteinic fraction by an economically suitable process.

From the biological standpoint, the nourishing value of the vegetal proteins is not equivalent to the nourishing value of the milk proteins, as their composition of essential aminoacids is different both quantitatively and qualitatively.

In order to obviate this drawback and in order to render as much as possible the biological value of the vegetal proteins to be that of the milk proteins, it is necessary to mix more vegetal proteins, or to balance the mixtures with pure aminoacids or mixtures of pure aminoacids, or with suitably transformed low cost animal proteins.

In the feeding of the young mammals, besides the composition of essential aminoacids of the proteins, of fundamental importance is the chemical-physical form of the protein itself.

As the physical-chemical form of the proteins of the milk is different from that of the vegetal proteins, in order to render the last cited proteins physiologically digestible and assimilable, it is necessary to submit said proteins to an adequate physical-chemical treatment.

Accordingly the object of this invention is the preparation of "vegetal proteinic concentrates" consisting of a proteinic fraction of carbohydrates and mineral salts, which are easily digestible and assimilable.

These "concentrates" can be mixed with fats in various proportions.

Within the scope of this invention come also the complete feed containing said concentrates.

A typical composition of the "vegetal proteinic concentrate" feed is as follows:

| | |
|---|---|
| water | 2–13% |
| proteinic substances | 20–95.0% |
| fats | 0–45.0% |
| carbohydrates | 1–60.0% |
| ash | 2–13.0% |

In order to render more clear the features of this invention, the various components of the products forming the objects of the present invention will be individually examined.

PROTEINIC SUBSTANCES

The proteinic raw materials used for preparing the proteinic concentrates are flours obtained from the oily seeds, namely the flours extracted from soya, peanut, sunflower, sesame, cotton, rapeseed, etc.; also it is possible to use certain leguminous substances which are relative protein rich, such as broad beans, beans and certain types of yeasts.

By chemical hydrolysis the proteinic fraction containing carbohydrates and mineral salts is transformed into protein hydrolysis products, either soluble or dispersable in water, and entirely digestible and assimilable.

The transformation of the proteins due to hydrolysis is carried out by means of acids and hydroxides, at adequate temperature and concentration; the so treated proteins are broken down into a mixture of albumoses, peptones, peptides and aminoacids in a definite ratio.

For accomplishing the acid hydrolysis of the proteins preferably use is made of hydrochloric acid and/or phosphoric acid, while for accomplishing the alkaline hydrolysis use is made of sodium hydroxide, sodium carbonate and/or hydrated lime; the mineral salts deriving from these hydrolyses will biologically integrate into the finished product.

To the acid hydrolysis it is possible to add citric and/or lactic acid in the amount of 2 to 10%, as calculated on the amount of necessary inorganic acid.

To the alkaline hydrolysis it is possible to add magnesium oxide in the amount of 2 to 5% with respect to the alkali as used in the hydrolysis.

The concentration of the acid and of the alkali is a function of the time and of the temperature at which the hydrolyses are carried out, preferably from 0.2% to 10% for the acids and from 0.1 to 5% for the alkaline substances.

The degree of hydrolysis can be considered to be reached when 50–95% of the initial proteins will appear to be transformed into soluble proteins and when 5–30% of the total nitrogen will be transformed into amino nitrogen.

The temperature can vary from 80° 125° C and the hydrolysis time from 2 to 12 hours.

The process which proved to be most practical is that consisting in carrying out simultaneously two hydrolyses, one in acid medium and the other in alkaline medium; when the two hydrolysates will be united, besides the hydrolyzed proteins, a formation of mineral salts will be obtained forming totally or partially the mineral fraction of the finished product.

In order to improve the biological value of the vegetal proteins it is possible to use mixtures of various vegetal proteins, or it will be possible to balance the hydrolisate by animal proteins namely dried blood powder, fish powder, dried meat powder, suitably transformed to assimilable products by the same process as used for the vegetal proteins.

Another means for balancing the vegetal proteins consists in integrating them with amounts of essential aminoacids, namely methionine, lysine, triptophan, etc.

CARBOHYDRATES

Normally the carbohydrates contained in the raw vegetal materials have different natures; monosaccharides, like glucose, disaccharides like saccharose, or polysaccharides like starch and cellulose; also pentosans or oligosaccharides can be present.

Not all of the carbohydrates present in the vegetal flours can be utilized by the organism.

Some of them, like glucose, can be utilized like they are in their physiological form; the polysaccharides like the starches and the like, in order to be assimilated must be suitably treated and transformed into simpler sugars; others, like the oligosaccharides, for instances raffinose and stachyose are regarded as being harmful for the digestive function of the digestive system, as are also raw fibers if their percentage is greater than 2%.

If the raw materials are fiber- or cellulose-rich, the fibers and the cellulose must be removed from the proteinic fraction, also by conventional processes.

To the "proteinic concentrate" it is possible to add carbohydrates, such as glucose, dextrose, saccharose, and so on.

FATS

The vegetal raw materials used for preparing the proteinic concentrates are poor in fat substances (not beyond 5%). For technological and nourishing reasons, it could be required to add fat substances which can have an animal origin, beef tallow, lard, cod liver oil, or vegetal oils or mixtures thereof.

It has been proved that it is very advantageous to emulsify the fats in the proteinic concentrate to a liquid state, as after drying, the fats appear to be directly incorporated into the proteinic fraction. Under this form, the fat substances appear to be more easily digestible and assimilable by the young animals.

MINERAL SALTS

The mineral salts consist of the salts normally contained in the vegetal raw materials as well as of the mineral salts derived from the reaction due to the hydrolysis; said salts are in form of salts of calcium, phosphorus, sodium, potassium, magnesium, etc., and of trace elements like iron, manganese, cobalt and iodine.

If advisable, the mineral salts may be integrated by the addition of adequate mixtures of mineral salts, while the trace elements can be also added under the form of aminoacid complex.

The "proteinic concentrates" can be used in the preparation of the milk substitutes. They are mixed, according to a pre-established formula, with milk derivatives, namely skimmed milk, fat added skimmed milk, milk serum, sugars, mineral salts, trace elements, vitamins and growth factors.

It is possible now to define as a specific object of this invention a process for preparing milk substituting vegetal proteinic concentrates in the feeds of the young mammals characterized in:

a. submitting to hot acid hydrolysis a vegetal flour or a mixture of vegetal flours with a proteinic content from 20 to 75%, from which have been removed the fibrous discards, which is finely ground until rendering soluble the 50% of the proteins and reaching an amount of amino nitrogen equalling 5% of the total nitrogen;

b. submitting to alkaline hydrolysis a vegetal flour or a mixture of vegetal flours as per (a) until rendering soluble 50% of the proteins and carrying the contents of amino nitrogen to 5% of the total nitrogen.

c. Mixing the (a) and (b) hydrolysates, and neutralizing up to pH = 6.7 – 7.1;

d. concentrating the neutralized mixture (c) until a 30–50% contents of dry material is obtained and drying.

Said vegetal flours used as raw materials for preparing the vegetal proteinic concentrates are mainly as aforesaid, flours of soya, peanut, ricinus, rapeseed, cotton, sunflower, maize gluten, rice, etc.

The obtained proteinic concentrate feed is characterized by the composition as follows:

| water | 2–13% |
| proteinic substances | 20–95% |
| fats | 0–45% |
| carbohydrates | 1–60% |
| ash | 2–13% |

As aforesaid, the (a) and (b) hydrolysates can be integrated, in order to improve their biological value, by animal proteins such as dried blood powder, dried meat powder, and dried fish powder, rendered assimilable.

Otherwise the vegetal proteins can be balanced by the addition of essential aminoacids, such as methionine, lysine, triptophan, etc.

Other additions, sometimes necessary, are of carbohydrates, namely glucose, dextrose, mannose etc.

Finally, if the contents of fat substances is low (up to 5%) it will be necessary to integrate the dry vegetal proteinic concentrates, as obtained by the described process, by the addition of fat substances having either an animal origin, like beef tallow, lard, cod liver oil, or vegetal origin like vegetal oils generally. These additions are made preferably by emulsifying the said fats in the proteinic concentrate, and drying subsequently the previously homogeneized product.

Also the salt content of the proteinic concentrates can be integrated by addition of mixtures of mineral salts, and further it is possible to add oligo-elements in the form of complex salts of the aminoacids.

Some examples of preparation of the "proteinic concentrate" feed according to the present invention are hereinafter described, and given for illustrative purpose only.

EXAMPLE 1

Proteinic concentrate from soya flour.

a. Acid hydrolysis — In a double bottom reactor, provided with commercial stirrer and made of acid resistant material, are poured 500 liters of water and 3 to 100 kgs of commercial grade hydrochloric acid, or 1 to 50 kgs of commercial grade phosphoric acid, or a mixture of the two acids.

To the acid solution, 100 kgs of soya flour, hulled and finely ground are slowly added, under stirring; the hydrolysis is carried out for a time from 2 to 12 hours at a temperature of 80° - 120° C. The duration of the hydrolysis depends upon the concentration of the acid, the temperature and the degree of hydrolysis which is to be obtained.

The hydrolysis can be considered ended when at least 50% of the protein contained within the extraction flour will be soluble at pH 6.5-8 and the amount of amino nitrogen reaches 5% of the total nitrogen.

b. Alkaline hydrolysis — In a double bottom reactor, provided with a stirrer, 500 liters of water are poured to which are slowly added 100 kgs of hulled and finely ground soya flour, and 0.5 to 20 kgs of sodium hydroxide or 1 to 25 kgs of calcium hydroxide or a mixture of the two substances. The hydrolysis is carried out at a temperature of 80° to 120° C for 2-12 hours. The duration of the hydrolysis depends upon the concentration of the alkali, the temperature and the degree of hydrolysis which is to be reached.

The hydrolysis can be considered ended when at least 50% of the proteinic contents of the extraction flour has been dissolved at pH 6.5-8 and the amount of amino nitrogen reaches at least 5% of the total nitrogen.

c. Neutralization — When the reaction is ended, the two hydrolysates as above described are poured into a reactor provided with a stirrer. The product of the reaction has a pH of about 7.

If the pH is either too high or too low it is necessary to adequately correct it with either hydrochloric acid or sodium hydroxide or calcium hydroxide, until reaching a pH between 6.7 and 7.1.

The neutralized product is concentrated under vacuum until having a content of dry substance of 30-50%. The product is then dried by conventional methods, preferably by a spray drying method.

The ratio between the material submitted to acid hydrolysis and that submitted to alkali hydrolysis must not necessarily be of 50%, and can be varied according to the exigencies.

EXAMPLE 2

Proteinic concentrate from mixtures of vegetal proteins.

a. Separation of proteins

Into a double bottom reactor, provided with a stirrer, are poured 1000 liters of water at a temperature 1° to 5° C; under stirring are added 50 kgs of peanut dry flour, 50 kgs of soya dry flour, 50 kgs of sunflower dry flour, 50 kgs of sesame dry flour.

The amount and the quality of the proteinic raw materials can be changed; it is possible to add or to remove certain raw materials, introducing other materials in the manufacture, such as for instance dry flour of cotton, rapeseed, ricinus etc.

Under stirring sodium hydroxide is added until reaching a pH 8.5-11.

The mixing is continued for 2 hours, then the liquid is removed by filtering or centrifuging.

About 700 liters of liquid are obtained containing, besides the dissolved proteins, mineral salts and carbohydrates.

This liquid is divided in two parts and hydrolysed; one part with acid and the other part with alkali.

b. Acid hydrolysis

In a reactor made of acid resistant material, are poured 350 liters of the liquid prepared as aforesaid, which is neutralized with hydrochloric acid or phosphoric acid. To the neutralized liquid are added 3 to 100 kgs of commercial grade hydrochloric acid, or 1 to 50 kgs of commercial grade phosphoric acid, or a mixture of the two acids, and the mixture is left to hydrolise at a temperature 80° - 120° C for two-twelve hours.

The duration of the hydrolysis depends upon the concentration of the acid, the temperature and the degree of hydrolysis which is to be reached.

The hydrolysis can be considered ended when at least 50% of the contained protein has become soluble at pH 6.5-8 and the amount of amino nitrogen reaches at least 5% of the total nitrogen.

c. Alkali hydrolysis

In a double bottom reactor provided with stirrer, are poured 350 liters of a liquid prepared as disclosed under (a).

As this liquid is alkaline, it can be hydrolyzed as it stands, or 0.25 to 10 kgs of sodium hydroxide, or 0.5 to 12.5 kgs of calcium hydroxide or a mixture of these two substances are added, and the mixture is left to hydrolize at 80°-120° C for 2-12 hours.

The duration of the hydrolysis depends upon the concentration of the alkali, the temperature and the degree of hydrolysis to be reached.

The hydrolysis can be considered ended when at least 50% of the proteinic content of the extraction flours has been dissolved at pH 6.5-8 and the amount of the amino nitrogen reaches at least 5% of the total nitrogen.

EXAMPLE 3

Fat added proteinic concentrate.

a. Acid hydrolysis.

Carried out as in Example 1 (a) and in Example 2 (b).

b. Alkaline hydrolysis.

Carried out as in Example 1 (b) and in Example 2 (c).

c. Neutralization.

When the neutralization has been carried out as in Example 1 (c) and in example 2 (d) the product is concentrated under vacuum to a content of dry substance of 30-50%.

d. Preparation of the fat mixture.

In a melting pot 90-95% kgs of animal fats or of vegetal oils are heated at 50°-60° C. To the melted fat are added from 1 to 6% of lecithin, or 0.1 to 2% of mono and/or diglyceride stearate, or a mixture of lecithin and glycerin stearate, or also other emulsifying agents or mixtures of emulsifying agents.

From this mixture 10 to 100 kgs of product are taken and emulsified with the proteinic concentrate (30-50% dry substance.). The fat added product is dried after passage through a homogeneizer.

EXAMPLE 4

Milk substitutive feed "S.L." for calves.

In a horizontal or vertical mixer for powders, with hermetical closure are mixed kgs 83.5 of fat added vegetal proteinic concentrate prepared as in Example 3
kgs 15.7 of milk serum powder
kgs 0.8 of vitaminic mineral integrating agent.

The product thereby obtained has the composition as follows:

| Water | 5.0 | |
|---|---|---|
| Raw protides | 29.0 % | |
| Raw lipids | 32.0 % | |
| Raw fiber | 1.0 % | on the dry substance |
| Ash | 9.5% | |
| Non nitrogenous extracts | 38.5 % | |

Feeding tests on calves

A feeding test has been carried out on calves with "S.L." feed as described in Example 4, mixed in proportions from 25 to 50% with "N" milk substitute, manufactured and largely known in the international market.

The "N" milk substitute has the composition as follows:

| Water | 5.0 % | |
|---|---|---|
| Raw protides | 22.0 % | |
| Raw lipids | 18.0 % | |
| Raw fiber | 0.5 % | on the dry substance |
| Ash | 7.5 % | |
| Non nitrogenous extracts | 52.0 % | |

"N" milk substitute has the following formulation:

| Powdered milk | 64% |
|---|---|
| Powdered milk serum (whey) | 14% |
| Fats | 18% |
| Starch | 2% |
| Vitaminic and mineral additives | 2% |

The test has been carried out on 60 calves (54 males and 6 females) subdivided as follows:
Checking group
20 calves (18 males and 2 females), medium weight 56.8 kgs.
This group was fed only with "N" milk substitute.
Test group
40 calves (36 males and 4 females) medium weight 56.2 kgs.
This group was fed with a mixture of "S.L." feed, and "N" milk substitute, in a proportion from 25 to 50%.

The animals were maintained in suitable wood cages, one animal for each cage fed by a bucket and weighed each 15 days.

The initial dosage was 200 grams per day, divided in two rations with dilution 1:10 and was given in an equal amount to both the control group and to the test group.

The feeding dose was increased each four days by 50 grams. Since the 45th day, the animals of the test group assimilated in an optimum way the feed, their feeding ration was increased by 50 grams each 4 days for the control group and by 100 grams for the test group.

After the 85th day, the test group was divided into two groups A and B, with 20 animals for each group.

The test group group A, continued to eat a feed ration consisting of a mixture of 25% of "S.L." feed, and 75% of "N" milk substitute, while in the group B the ratio of the "S.L." feed was 40% and that of the "N" milk substitute was 60%.

After another 15 days, the percent of the "S.L." feed was increased to 45% and in the last 25 days to 50%.

The test was terminated after 150 days, when most of the calves reached and exceeded the 200 kgs.

This test demonstrated that:

1. The mixture of the "S.L." feed in the proportion of 25≧50% to 75-50% of "N" milk substitute was perfectly tolerated and appetizing.

2. The state of the health of the animals in the course of the test proved to be optimum.

3. The conversion index and the rates of increment of the weight were almost identical in both the control group and in the test group, as shown in the following Table.

| | Increment of weight | Consumed feed | Convers. index | Average % |
|---|---|---|---|---|
| Control Test | kg. 132.4 | kg. 230.55 | 1.74 | 57.0 |
| Group A | kg. 145.5 | kg. 245.20 | 1.68 | 59.2 |
| Group B | kg. 146.6 | kg. 245.20 | 1.67 | 59.7 |

4. The tested animals reached the same weight level sooner than the control animals, and this indicated a reduction of the breeding times.

The slaughter tests of the calves showed the results as follows: the slaughter yeild was 58.5% for the animals of the test group, and the same yield was reached by the animals of the control group.

The organoleptic characteristics of the "white meat" of the animals fed with "S.L." feed are not modified with respect to those fed with "N" milk substitute.

The present invention has been described with particular reference to specific embodiments thereof, it being understood that changes might be adopted without thereby departing from the scope of this invention.

I claim:

1. A process for preparing a vegetal proteinic feed to be used as base material for replacing natural milk for nutrition of young mammals, said process comprising the steps of: submitting to a bland acid hydrolysis at a temperature of 80°-120° C at least one vegetal flour with a proteinic content of 20-75% by an acid in solution of 0.2 to 10% acid and controlling the hydrolysis to solubilize at least 50% of the proteins and transform 5-30% of the proteins into free amino acids, submitting to a bland alkaline hydrolysis at least one vegetal flour with a proteinic content of 20-75% by an alkali in solution of 0.1 to 5% alkali and controlling the hydrolysis to solubilize at least 50% of the proteins and transform 5-30% of the proteins into free amino acids, and mixing the acid hydrolysate and alkaline hydrolysate and adjusting said mixture to a pH value of 6.7 to 7.1, and wherein fats in nutritional amounts are intimately incorporated into said neutralized hydrolysate mixture to form a stable emulsion, whereby in the process the proteinic fraction is resolved into easily digestible derivatives, a great part of the polysaccharides is resolved in simpler sugars, the enzymes are destroyed and the oligosaccarides which are harmful for the digestion are removed.

2. A process as claimed in claim 1, wherein the acid used for the acid hydrolysis is hydrochloric acid.

3. A process is claimed in claimed 1, wherein the acid used for the acid hydrolysis is phosphoric acid.

4. A process as claimed in claim 1, wherein the acid used for the acid hydrolysis is a mixture of hydrochloric acid and phosphoric acid.

5. A process as claimed in claim 1, wherein the alkali used for the alkaline hydrolysis is sodium hydroxide.

6. A process as claimed in claim 1, wherein the alkali used for the alkaline hydrolysis is calcium hydroxide.

7. A process as claimed in claim 1, wherein the alkali used for the alkaline hydrolysis is a mixture of calcium hydroxide and sodium hydroxide.

* * * * *